US008087490B2

(12) United States Patent
Nozaki et al.

(10) Patent No.: US 8,087,490 B2
(45) Date of Patent: Jan. 3, 2012

(54) ALL TERRAIN VEHICLE

(75) Inventors: Takuma Nozaki, Kobe (JP); Itsuo Takegami, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 120 days.

(21) Appl. No.: 12/648,421

(22) Filed: Dec. 29, 2009

(65) Prior Publication Data

US 2011/0155498 A1    Jun. 30, 2011

(51) Int. Cl.
*B62D 5/04* (2006.01)
(52) U.S. Cl. ........................ 180/444; 180/443
(58) Field of Classification Search ............... 180/443, 180/444
See application file for complete search history.

(56) References Cited

U.S. PATENT DOCUMENTS

| 6,237,954 | B1 * | 5/2001 | Sato et al. ..................... 280/775 |
| 6,964,432 | B2 * | 11/2005 | Morita et al. ................. 280/775 |
| 7,384,070 | B2 * | 6/2008 | Sato et al. ..................... 280/777 |
| 7,604,084 | B2 * | 10/2009 | Okada et al. .................. 180/443 |
| 7,618,063 | B2 * | 11/2009 | Takeshima et al. ........... 280/785 |
| 7,641,022 | B2 * | 1/2010 | Okada et al. .................. 180/444 |
| 7,665,570 | B2 * | 2/2010 | Okada et al. .................. 180/443 |
| 7,775,318 | B2 * | 8/2010 | Okada et al. .................. 180/444 |
| 7,878,293 | B2 * | 2/2011 | Okada et al. .................. 180/443 |
| 7,954,835 | B2 * | 6/2011 | Nakamura et al. ..... 280/124.135 |
| 2005/0093284 | A1 * | 5/2005 | Sato et al. ..................... 280/777 |
| 2005/0178603 | A1 * | 8/2005 | Takeshima et al. ........... 180/311 |
| 2005/0284250 | A1 * | 12/2005 | Suzuki ............................ 74/492 |
| 2006/0180385 | A1 * | 8/2006 | Yanai et al. .................... 180/444 |
| 2006/0196722 | A1 * | 9/2006 | Makabe et al. ................ 180/443 |
| 2007/0074928 | A1 * | 4/2007 | Okada et al. .................. 180/444 |
| 2007/0096449 | A1 * | 5/2007 | Okada et al. .................. 280/775 |
| 2008/0053743 | A1 * | 3/2008 | Tomita ........................... 180/443 |
| 2009/0014976 | A1 * | 1/2009 | Matsuura ............... 280/124.134 |
| 2009/0078492 | A1 * | 3/2009 | Tsutsumikoshi et al. ..... 180/443 |
| 2009/0120230 | A1 * | 5/2009 | Park ................................ 74/493 |
| 2009/0243248 | A1 * | 10/2009 | Nakamura et al. ..... 280/124.135 |

FOREIGN PATENT DOCUMENTS

JP    2007-118842    5/2007

* cited by examiner

*Primary Examiner* — Joanne Silbermann
*Assistant Examiner* — Michael Stabley
(74) *Attorney, Agent, or Firm* — Alleman Hall McCoy Russell & Tuttle LLP

(57) ABSTRACT

An all terrain vehicle includes a steering shaft to which a handle is coupled, a coupling device configured to rotatably couple the steering shaft to a vehicle body frame, and a power steering device which is mounted to the vehicle body frame, the power steering device including an input shaft to which the steering shaft is coupled, wherein the coupling device includes plural members provided with bolt holes and a bolt inserted into the bolt holes in a state where the plural members are joined to each other; and wherein at least one of the plural members has an elongate hole as the bolt hole.

11 Claims, 5 Drawing Sheets

ALL TERRAIN VEHICLE

BACKGROUND OF THE INVENTION

1. Field of the Invention

The present invention relates to an all terrain vehicle (ATV) including a power steering device.

2. Description of the Related Art

An all terrain vehicle including an electric power steering device to reduce a force required for a driver's steering operation, is known. The electric power steering device includes an input shaft coupled coaxially with a steering shaft provided with a handle, an output shaft coupled to a front wheel via a tie rod, an electric motor generating a steering force, etc. In an all terrain vehicle disclosed in Japanese Laid-Open Patent Application Publication No. 2007-118842, two sets of universal joints are provided between a steering shaft mounted to the upper portion of a vehicle body frame and an input shaft of an electric power steering device mounted to the lower portion of the vehicle body frame. In this all terrain vehicle, a positional difference between the center axis of the steering shaft and the center axis of the input shaft of the electric power steering device, which may be caused by a tolerance of the vehicle body frame or the like, is absorbed by the universal joints.

However, in this all terrain vehicle, since the universal joints are needed in a steering mechanism, a cost of the components increases. Therefore, there is a need to absorb the positional difference between the steering shaft and the input shaft of the power steering device with a simple configuration.

SUMMARY OF THE INVENTION

An all terrain vehicle of the present invention comprises a steering shaft to which a handle is coupled; a coupling device configured to rotatably couple the steering shaft to a vehicle body frame; and a power steering device which is mounted to the vehicle body frame, the power steering device including an input shaft to which the steering shaft is coupled; wherein the coupling device includes plural members provided with bolt holes and a bolt inserted into the bolt holes in a state where the plural members are joined to each other; and wherein at least one of bolt holes of one of the plural members is an elongate hole.

In accordance with such a configuration, the positional relationship between plural members, i.e., the positional relationship between the steering shaft and the input shaft of the power steering device, can be easily adjusted by adjusting the position of the bolt within the bolt hole formed by the elongate hole. As a result, a tolerance of the vehicle body frame can be absorbed with a simple configuration.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the drawings. As used herein, the directions are referenced from a driver mounting an all terrain vehicle.

Figure 1:
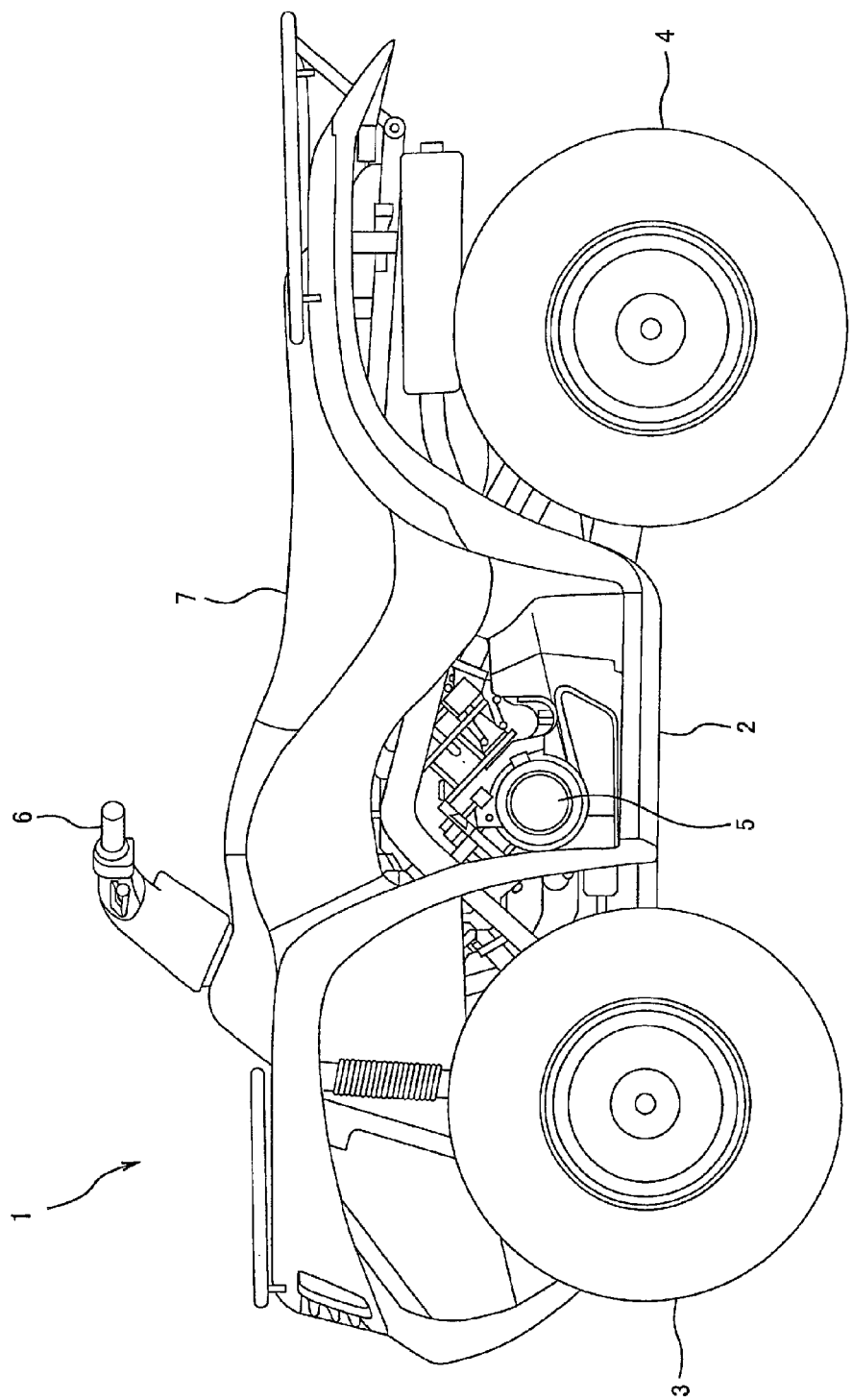
FIG. 1 is a left side view of an all terrain vehicle according to an embodiment of the present invention.

FIG. 1 is a left side view of an all terrain vehicle 1 according to an embodiment of the present invention. Turning to FIG. 1, the all terrain vehicle 1 is a straddle-type four-wheeled vehicle, including a vehicle body frame 2 formed by a weld assembly mainly including metal-made pipes, a front wheel 3 suspended at the front portion of the vehicle body frame 2, and a rear wheel 4 suspended at the rear portion of the vehicle body frame 2. An engine 5 is positioned between the front wheel 3 and the rear wheel 4 and is mounted to the vehicle body frame 2. A bar-type steering handle 6 is provided behind and above the front wheel 3 for the driver to steer the vehicle 1. A seat 7 straddled by the driver is mounted behind the handle 6.

Figure 2:
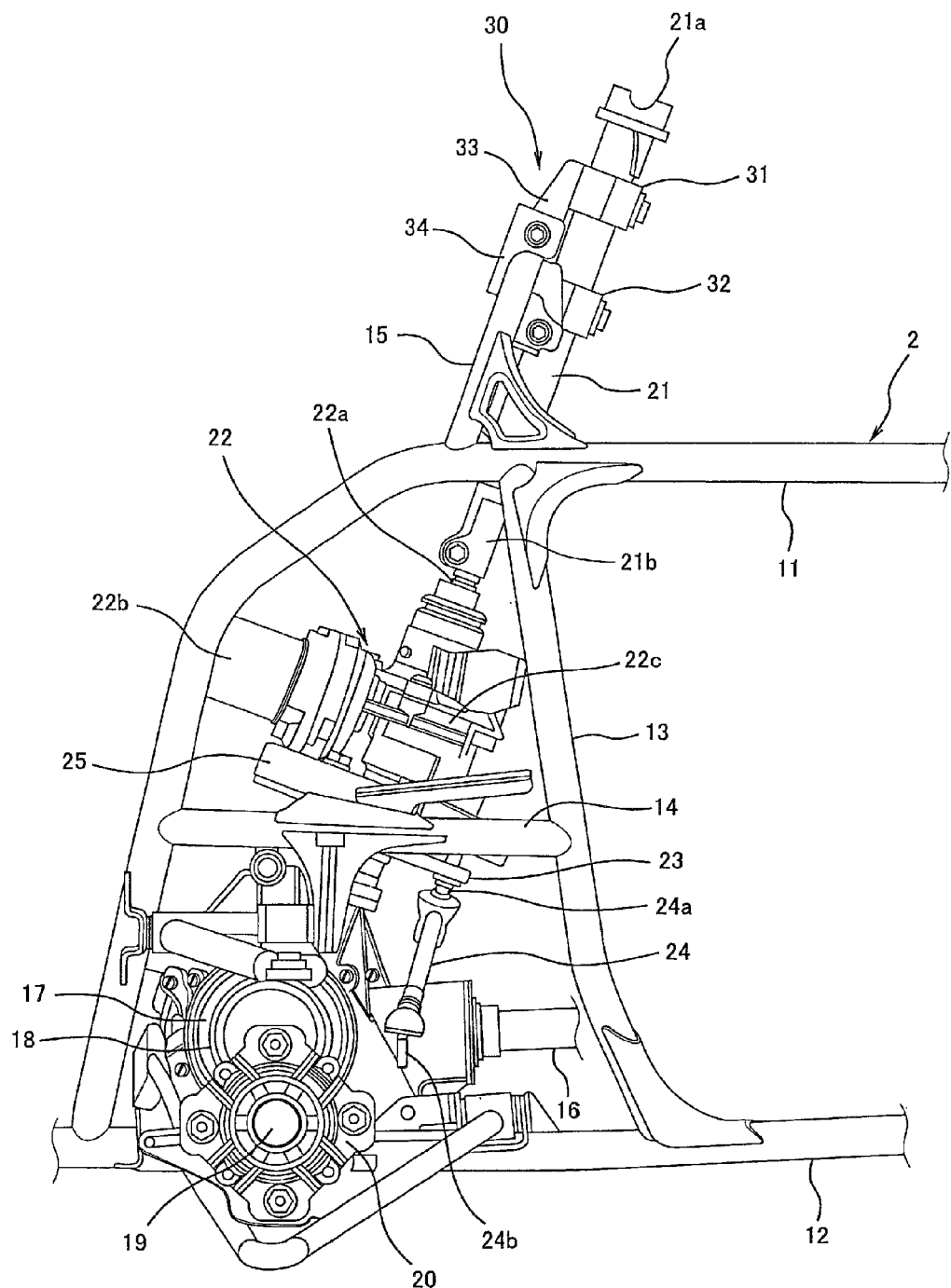
FIG. 2 is a left side view showing a region surrounding a steering shaft of the all terrain vehicle of FIG. 1.

FIG. 2 is a left side view showing a region surrounding a steering shaft 21 of the all terrain vehicle 1 of FIG. 1. As shown in FIG. 2, the vehicle body frame 2 includes a pair of right and left upper main frame members 11 extending in the longitudinal direction of the vehicle 1, and a pair of right and left lower main frame members 12 extending in the longitudinal direction below the upper main frame members 11. The lower ends of the portions tilted in a downward direction at the front portions of the upper main frame members 11 are coupled to the lower main frame members 12, respectively. A gusset pipe member 13 vertically extending to be slightly tilted is coupled to the intermediate portion of each upper frame member 11 and the intermediate portion of each lower main frame member 12. A sub-gusset pipe member 14 extending substantially horizontally is coupled to the front portion of each upper main frame member 11 and to the intermediate portion of the gusset pipe member 13. A steering support frame member 15 is coupled to the front portion of the upper main frame members 11 to couple the right and left upper main frame members 11 to each other. The steering support frame member 15 protrudes upward and has an inverted U-shape as viewed from the front.

A transaxle device 17 is provided on a center line extending in the longitudinal direction of the all terrain vehicle 1, as viewed from above, in a region between the lower main frame member 12 and the sub-gusset pipe member 14 as viewed from the side. A propeller shaft 16 for transmitting a driving power from the engine 5 (see FIG. 1) is coupled to the transaxle device 17. The transaxle device 17 includes a gear case 18 in which a reduction gear and a differential gear are accommodated, an axle 19 protruding laterally from the gear case 18, and a brake unit 20 which is provided at the tip end of the axle 19 and coupled to the front wheel 3.

A metal-made steering shaft 21 is disposed at the front portion of the vehicle body frame 2. The steering shaft 21 extends through the center region between the right and left upper frame members 11 such that the steering shaft 21 extends vertically so as to be slightly tilted. A handle mounting member 21a is provided at the upper end portion of the steering shaft 21 to mount the bar-type steering handle 6 (see FIG. 1). A lower end portion 21b of the steering shaft 21 is coupled to an input shaft 22a of an electric power steering device 22 (hereinafter referred to as EPS device 22). The EPS device 22 is mounted to the vehicle body frame 2 such that the EPS device 22 is fastened to the sub-gusset pipe 14 by a support plate 25.

The EPS device 22 includes the input shaft 22a, a sensor (not shown), an electric motor 22b, a gear box 22c, an output shaft 22d (see FIG. 3), etc. The center axis of the input shaft 22a conforms to the center axis of the steering shaft 21. The electric motor 22b is oriented in a forward direction perpendicular to the input shaft 22a. The electric motor 22b is disposed in a location which is slightly distant to the left from the center axis extending in the longitudinal direction of the vehicle 1 as viewed from above.

The output shaft 22d (see FIG. 3) of the EPS device 22 is attached with a center arm 23 (see FIG. 2) such that the center arm 23 is rotatable integrally with the output shaft 22d. One end portions 24a of a pair of the right and left tie rods 24 (see FIG. 2) are rotatably coupled to the center arm 23. Opposite end portions 24b of the tie rods 24 are rotatably coupled to an arm (not shown) attached to the front wheel 3 (see FIG. 1).

When the driver steers the handle 6 (see FIG. 1) to rotate the steering shaft 21, the rotational force is transmitted to the input shaft 22a of the EPS device 22. In the EPS device 22, a sensor (not shown) detects the rotational force input to the input shaft 22a, and the electric motor 22b applies an auxiliary rotational force to the steering shaft 21 based on a detection signal from the sensor. As a result, the steering force of the front wheel 3 is reduced, and the driver can steer the handle 6 (see FIG. 1) with a smaller force.

The steering shaft 21 is coupled to the steering support frame member 15 of the vehicle body frame 2 by a coupling device 30. The coupling device 30 includes two support members 31 and 32 for rotatably supporting the steering shaft 21, a first bracket 33 coupled to the support members 31 and 32, and a second bracket 34 coupled to the steering support frame member 15. Since the support members 31 and 32 are vertically spaced apart from each other, the steering shaft 21 is stably retained so as not to move in a tilted direction even when a force for tilting the steering shaft 21 is applied to the steering shaft 21. Therefore, it is possible to suitably prevent that the load is applied to the input shaft 22a of the EPS device 22.

Figure 3:
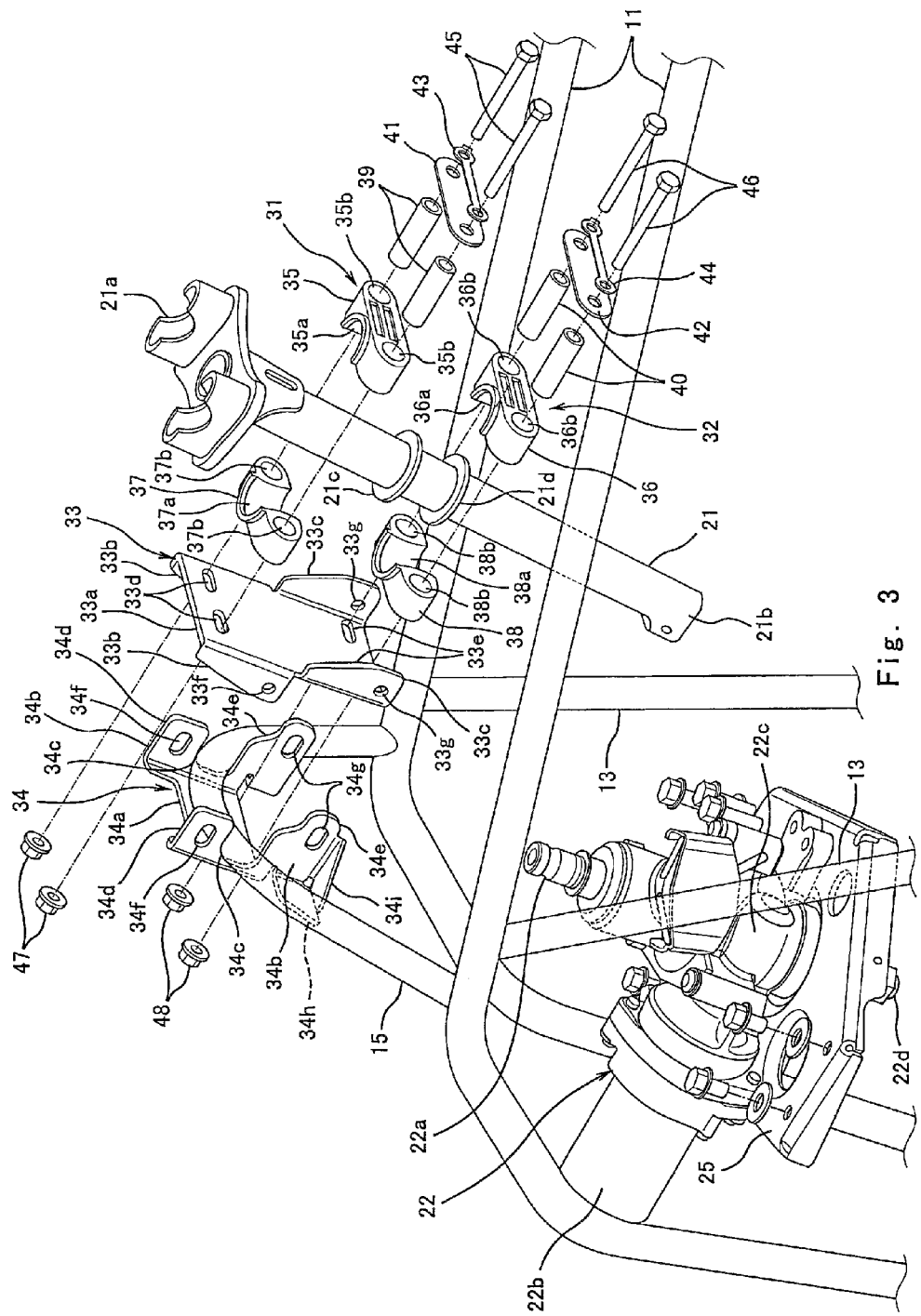
FIG. 3 is an exploded perspective view showing the region surrounding the steering shaft of the all terrain vehicle of FIG. 2, before the components are assembled.

FIG. 3 is an exploded perspective view showing the region surrounding the steering shaft 21 of the all terrain vehicle of FIG. 2, before the components are assembled. As shown in FIG. 3, the support members 31 and 32 are resin-made clamps for rotatably supporting the steering shaft 2 (hereinafter the support members 31 and 32 are referred to as resin-made clamps 31 and 32). The resin-made clamp 31 includes a pair of front and rear steering bushes 35 and 37 which are joined to form a tubular shape. The resin-made clamp 32 includes a pair of front and rear steering bushes 36 and 38 which are joined to form a tubular shape. The steering bushes 35 to 38 have semicircular inner peripheral surfaces 35a to 38a, respectively, and bolt insertion holes 35b to 38b, respectively. Each of the steering bushes 35 to 38 is integrally molded using resin. The front and rear steering bushes 35 and 37 are joined to each other to form a tubular space between the semicircular inner peripheral surfaces 35a and 37a. The front and rear steering bushes 36 and 38 are joined to each other to form a tubular space between the semicircular inner peripheral surfaces 36a and 38a. The steering shaft 21 is rotatably inserted into these tubular spaces. Collars 39 are respectively inserted into the bolt insertion holes 35b and 37b connected to each other in a state where the front and rear steering bushes 35 and 37 are joined to each other. Collars 40 are respectively inserted into the bolt insertion holes 36b and 38b connected to each other in a state where the front and rear steering bushes 36 and 38 are joined to each other. Bolts 45 are inserted into the collars 39, respectively, via a washer plate 41 and a lock washer 43. Bolts 46 are inserted into the collars 40, respectively, via a washer plate 42 and a lock washer 44. The steering shaft 21 is provided with a pair of flanges 21c and 21d which are vertically spaced apart from each other to sandwich and retain the lower resin-made clamp 32 from above and from below.

The first bracket 33 is formed by press-forming of a metal plate. The first bracket 33 includes a base plate portion 33a whose normal line is oriented in the longitudinal direction, upper protruding plate portions 33b protruding forward from right and left sides of the base plate portion 33a so as to extend in a direction perpendicular to the base plate portion 33a, and lower protruding plate portions 33c protruding from right and left sides of the lower portion of the base plate portion 33a so as to extend rearward in a direction perpendicular to the base plate portion 33a. Two bolt holes 33d are formed at the upper region of the base plate portion 33a. The bolt holes 33d are formed by elongate holes each having a long axis extending in a substantially lateral direction. Two bolt holes 33e are formed at the lower region of the base plate portion 33a. The bolt holes 33e are formed by elongate holes each having a long axis extending in a substantially lateral direction. The long axes of the bolt holes 33d and 33e formed on the base plate portion 33a extend substantially in parallel. In other words, the long axes of the bolt holes 33d and 33e into which the bolts 45 and 46 oriented in the same direction (longitudinal direction) are inserted extend substantially in parallel. In the short axis direction of the bolt holes 33d and 33e formed by the elongate holes, only two holes, i.e., the holes 33d and 33e are formed. This makes it possible to adjust an angle as described later with reference to FIG. 5.

The protruding plate portion 33b and the protruding plate portion 33c are provided with a single bolt hole 33f and a single bolt hole 33g which have a true circle shape, respectively. The positions of the upper and lower bolt holes 33f and 33g deviate from each other in the longitudinal direction. In this case, since the upper protruding plate portion 33b and the lower protruding plate portion 33c protrude in opposite directions, the protruding length of each of the protruding plate portions 33b and 33c is suppressed, and the protruding plate portions 33b and 33c have high stiffness.

The second bracket 34 is formed by press-forming of a metal plate. The second bracket 34 includes a base plate portion 34a whose normal line is oriented in the longitudinal direction, and protruding plate portions 34b protruding from right and left sides of the base plate portion 34a so as to extend rearward in a direction perpendicular to the base plate portion 34a. The base plate portion 34a is disposed at the front side of the upper portion of the steering support frame member 15 so as to be substantially parallel to an imaginary flat plane on which the steering support frame member 15 is present. The protruding plate portions 34b have grooves 34c which are open rearward. The steering support frame member 15 is inserted into the grooves 34c. The peripheral edge of the grooves 34c and the steering support frame member 15 are welded and fastened to each other.

The protruding plate portions 34b include upper plate portions 34d which are located above the grooves 34c and are respectively provided with bolt holes 34f, and lower plate portions 34e which are located below the groove 34c and are respectively provided with bolt holes 34g. The lower plate portions 34e protrude rearward farther than the upper plate portions 34d. The lower bolt holes 34g are located behind the upper bolt holes 34f. In other words, the lower bolt holes 34g are provided so as to deviate from the upper bolt holes 34f in the normal line direction of the base plate portion 34a, and thus the lower bolt holes 34g are positioned behind the steering support frame member 15 so as not to overlap the steering support frame member 15 as viewed from the side. The upper bolt holes 34f are positioned immediately above the steering support frame member 15 as viewed from the side.

The bolt holes 34f and 34g formed in the protruding plate portions 34b of the second bracket 34 are formed by elongate holes having long axes extending substantially in the longitudinal direction. The long axes of the bolt holes 34f and 34g of the second bracket 34 are substantially perpendicular to the long axes of the bolt holes 33d and 33e of the first bracket 33. The long axes of the bolt holes 34f and 34g of the second bracket 34 are substantially parallel to each other. In other words, the long axes of the bolt holes 34f into which the bolt 49 is inserted and the long axes of the bolt holes 34g into which the bolt 50 is inserted extend substantially in parallel. The bolt 49 and the bolt 50 are oriented in the same direction when inserted into these bolt holes 34f and 34g. In the short axis direction of the bolt holes 34f and 34g formed by elongate holes, only two holes, i.e., the bolt holes 34f and 34g are formed. This makes it possible to adjust an angle as described later with reference to FIG. 5.

The second bracket 34 includes reinforcing plate portions 34h and 34i protruding from two sides of the lower plate portion 34e of the protruding plate portion 34b which are perpendicular to each other so as to extend in a direction perpendicular to the lower plate portion 34e. The reinforcing plate portion 34h extends substantially vertically and protrudes laterally outward from the front end portion of the lower plate portion 34e. The reinforcing plate portion 34i extending substantially horizontally protrudes laterally outward from the lower end portion of the lower plate portion 34e and extends rearward to a location behind the steering support frame member 15 as viewed from the side. The reinforcing plate portions 34h and 34i are welded and fastened to the steering support frame member 15.

Figure 4:
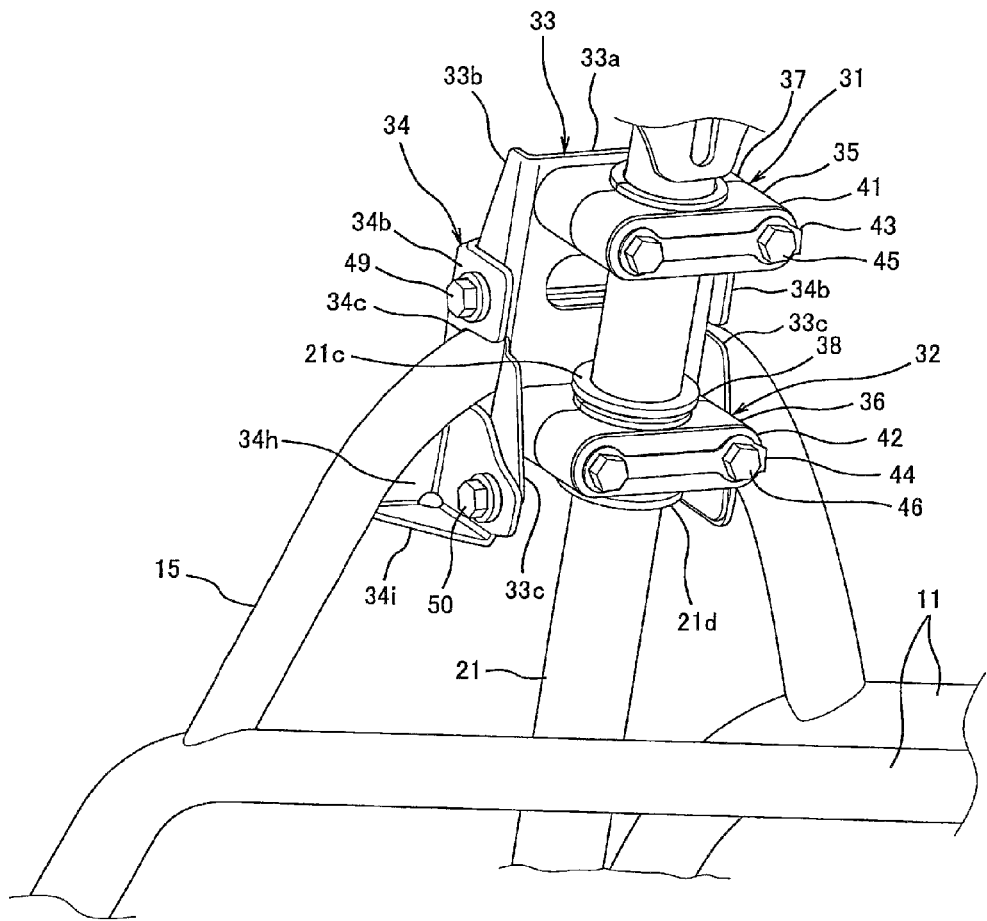
FIG. 4 is an exploded perspective view showing the region surrounding the steering shaft of the all terrain vehicle of FIG. 3, in a state where the components are assembled.

FIG. 4 is an exploded perspective view showing the region surrounding the steering shaft 21 of the all terrain vehicle 1 of FIG. 3, in a state where the components are assembled. As shown in FIGS. 3 and 4, the bolt 49 is inserted into the upper bolt holes 33f and 34f connected to each other and the bolt 50 is inserted into the lower bolt holes 33g and 34g connected to each other, in a state where the protruding plate portions 33b and 33c of the first bracket 33 are joined to the protruding plate portions 34b of the second bracket 34. Thereby, the first bracket 33 is fastened to the second bracket 34.

In the state where the resin-made clamps 31 and 32 are joined to the base plate portion 33a of the first bracket 33, the bolts 45 are inserted into the upper bolt holes 35b, 37b and 33d connected to each other and fastened by nuts 47, and bolts 46 are inserted into the lower bolt holes 36b, 38b and 33e connected to each other and fastened by nuts 48. In this manner, the resin-made clamps 31 and 32 are fastened to the first bracket 33. As a result, the steering shaft 21 is rotatably mounted to the steering support frame member 15 of the vehicle body frame 2 via the resin-made clamps 31 and 32, the first bracket 33 and the second bracket 34.

Figures 5A, 5B, 5C:
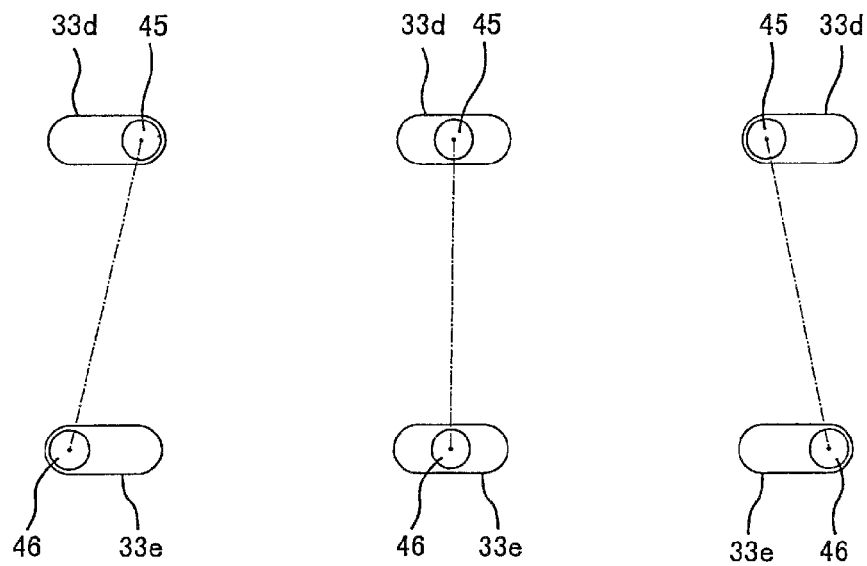
FIGS. 5A to 5C are views showing the positional relationship between two elongate holes whose long axes are substantially parallel to each other and bolts inserted into these holes.

FIGS. 5A to 5C are views showing the positional relationship between the two elongate holes 33d and 33e having long axes extending substantially in parallel and the bolts 45 and 46 inserted into these holes 33d and 33e. Since the bolt holes 33d and 33e of the first bracket 33 are elongate holes having long axes extending laterally as shown in FIGS. 3 to 5, the lateral positions of the resin-made clamps 31 and 32 with respect to the first bracket 33 can be easily adjusted by laterally moving the bolts 45 and 46 within the bolt holes 33d and 33e. In addition, since the bolt holes 33d and 33e extend substantially in parallel with each other as shown in FIGS. 5A to 5C, the tilting angle of the resin-made clamps 31 and 32 around the center axes of the bolts 45 and 46 can be easily adjusted by making the positions of the upper bolts 45 within the bolt holes 33d accommodate variations in the positions of the lower bolts 46 within the bolt holes 33e (see one-dotted line in FIGS. 5A to 5C), by an offset as illustrated in FIGS. 5A and 5C, or by a direct alignment as illustrated in FIG. 5B.

Likewise, since the bolt holes 34f and 34g of the second bracket 34 are elongate holes having long axes extending in the longitudinal direction, the longitudinal position of the first bracket 33 with respect to the second bracket 34 can be easily adjusted by moving the bolts 49 and 50 within the bolt holes 34f and 34g in the longitudinal direction. In addition, since the bolt holes 34f and 34g extend substantially in parallel with each other, the tilting angle of the first bracket 33 around the center axes of the bolts 49 and 50 can be easily adjusted by making the position of the upper bolt 49 within the bolt hole 34f accommodate variation in the position of the lower bolt 50 within the bolt hole 34g, such that the respective positions of the upper bolt 49 and lower bolt 50 are offset or directly aligned, as desired.

By adjusting the positions of the bolts 45, 46, 49 and 50 within the bolt holes 33d, 33e, 34f and 34g formed by elongate holes, the positional relationship between the steering shaft 21 and the input shaft 22a of the EPS device 22 can be easily adjusted. Therefore, the tolerance of the vehicle body frame 2 and the like can be absorbed with a simple configuration.

Figure 6:
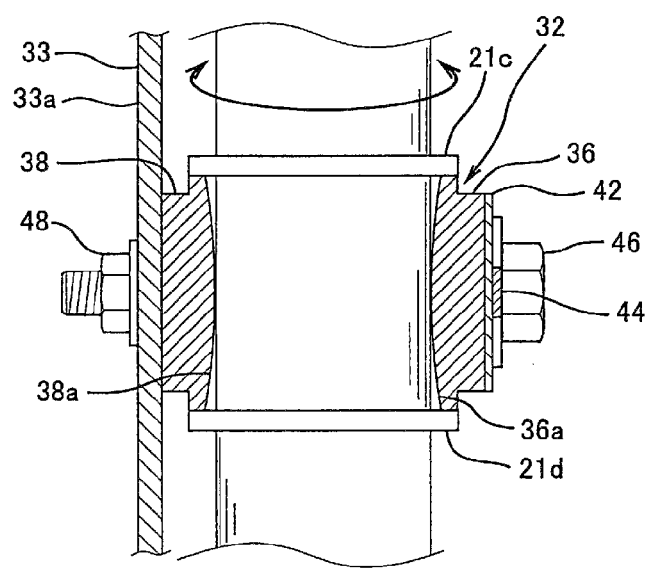
FIG. 6 is a left cross-sectional view showing a state where the steering shaft of the all terrain vehicle of FIG. 4 is supported by resin-made clamps.

FIG. 6 is a left cross-sectional view showing the state where the steering 21 is supported by the resin-made clamps 31 and 32 in the all terrain vehicle 1 of FIG. 4. As shown in FIG. 6, the semi-circular inner peripheral surfaces 36a and 38a of the steering bushes 36 and 38 of the resin-made clamps 31 and 32 have a circular-arc shape in which a center portion in the vertical direction protrudes inward. This reduces an area where the steering shaft 21 contacts the steering bushes 36 and 38, enabling the steering shaft 21 to rotate smoothly. Since the flanges 21c and 21d of the steering shaft 21 are provided at the upper and lower sides of the lower resin-made clamp 32, the vertical positional difference of the steering shaft 21 with respect to the resin-made clamp 32 can be prevented.

Although one of the bolt holes connected to each other has an elongate hole shape, and the other has a true circle shape in the above described embodiment, both of these holes may be elongate holes. In other words, at least one of the holes connected to each other may be an elongate hole. Although the flanges 21c and 21d of the steering shaft 21 are provided only at the lower resin-made clamp 32 in the above described embodiment, they may also be provided at the upper resin-made clamp 31.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An all terrain vehicle comprising:
a steering shaft to which a handle is coupled;
a coupling device configured to rotatably couple the steering shaft to a vehicle body frame; and
a power steering device which is mounted to the vehicle body frame, the power steering device including an input shaft to which the steering shaft is coupled;
wherein the coupling device includes plural members provided with bolt holes and a bolt inserted into the bolt holes in a state where the plural members are joined to each other;
wherein at least one of the bolt holes provided in one of the plural members is an elongate hole; and
wherein the plural members include a support member configured to rotatably support the steering shaft, a first bracket coupled to the support member, and a second bracket coupled to the vehicle body frame.

2. The all terrain vehicle according to claim 1,
wherein the bolt is one of a plurality of bolts inserted into the bolt holes in a state where the plural members are joined to each other;
wherein the elongate hole is one of a plurality of elongate holes included among the bolt holes that are provided in the plural members, each of the plurality of elongate holes corresponding to a respective one of the plural bolts; and
wherein respective long axes of at least two of the plural elongate holes extend in respective directions that are substantially perpendicular to each other.

3. The all terrain vehicle according to claim 1,
wherein the bolt is one of a plurality of bolts inserted into the bolt holes in a state where the plural members are joined to each other;
wherein the elongate hole is one of a plurality of elongate holes included among the bolt holes that are provided in the plural members and, each of the plurality of elongate holes corresponding to a respective one of the plural bolts; and
wherein respective long axes of at least two of the plural elongate holes extend in respective directions that are substantially parallel to each other.

4. The all terrain vehicle according to claim 1,
wherein the bolt is inserted into the bolt holes in a state where the first bracket and the second bracket are joined to each other; and
wherein at least one of the first bracket and the second bracket includes the elongate hole.

5. The all terrain vehicle according to claim 1,
wherein the bolt is inserted into the bolt holes in a state where the support member and the first bracket are joined to each other; and
wherein at least one of the support member and the first bracket includes the elongate hole.

6. The all terrain vehicle according to claim 1,
wherein the support member includes a pair of resin-made clamps configured to rotatably support the steering shaft; and
wherein the pair of resin-made clamps are mounted to the steering shaft such that the clamps are vertically spaced apart from each other.

7. The all terrain vehicle according to claim 1,
wherein the steering shaft is provided with a flange for retaining the support member.

8. The all terrain vehicle according to claim 1,
wherein each of the first bracket and the second bracket includes a base plate portion and a protruding plate portion protruding from both sides of the base plate portion so as to extend in a direction perpendicular to the base plate portion, each protruding plate portion being provided with at least one bolt hole of the bolt holes, and the base plate portion of the first bracket being provided with at least one bolt hole of the bolt holes;
wherein the bolt is inserted into the bolt holes in a state where the protruding plate portion of the first bracket and the protruding plate portion of the second bracket are joined to each other, and the bolt hole of at least one of the protruding plate portion of the first bracket and the protruding plate portion of the second bracket is the elongate hole; and
wherein the bolt is inserted into the bolt holes in a state where the base plate portion of the first bracket is joined to the support member; and the bolt hole of at least one of the base plate portion of the first bracket and the support member is the elongate hole.

9. The all terrain vehicle according to claim 8,
wherein the protruding plate portion of at least one of the first bracket and the second bracket includes a pair of protruding plate portions protruding from both sides of the base plate portion; and
wherein the pair of protruding plate portions protrude from the base plate portion in a direction away from each other.

10. The all terrain vehicle according to claim 8,
wherein the second bracket includes reinforcing plate portions protruding from two sides of the protruding plate portion of the second bracket so as to extend in a direction substantially perpendicular to the protruding plate portion of the second bracket, and the reinforcing plate portions are fastened to the vehicle body frame.

11. The all terrain vehicle according to claim 8,
wherein the vehicle body frame includes an inverted-U shaped steering support frame member;
wherein the base plate portion of the second bracket is provided at an upper portion of the steering support frame member such that the base plate portion is substantially parallel to an imaginary flat plane in which the steering support frame member is present;
wherein the protruding plate portion of the second bracket includes a groove into which the steering support frame member is inserted, at least one bolt hole of the bolt holes located above the groove and at least one bolt hole of the bolt holes located below the groove; and
wherein the bolt hole located below the groove is provided so as to deviate from the bolt hole located above the groove in a normal line direction of the base plate portion.

* * * * *